United States Patent Office 2,713,420
Patented July 19, 1955

2,713,420

CLARIFICATION PROCESS

Joseph Robert Lord, Los Angeles, Calif., assignor to Southwestern Engineering Company, Los Angeles, Calif., a corporation of California No Drawing. Application May 18, 1954,
Serial No. 430,729

9 Claims. (Cl. 209—166)

My invention relates to a method for the clarification of coal washery waste waters and the like.

At the colliery, coal is conventionally subjected to a washing treatment. After it has been used in such a treatment, the water presents a serious disposal problem, since it is contaminated with objectionable amounts of finely divided coal and finely divided high-ash residues or high-ash solids, both of which should be removed before the water is released to an adjacent stream or the like.

Methods have heretofore been proposed for recovering coal from fine washery refuse by froth flotation. However, no satisfactory method has been heretofore known to the art for separating the remaining suspended high-ash solids from the very dilute slurries discharged as refuse from the coal-flotation operation. Hence, prior to my present invention there has been no commercially acceptable method known to the public for completely treating colliery waste waters and the like in order to separate therefrom the powdered coal and the powdered high-ash residues or high-ash solids.

I have discovered a method whereby water, such as waste colliery washing water, having admixed therein minor amounts of powdered high-ash residues or high-ash solids, can be effectively clarified in a simple and convenient manner so that the water does not then present a serious disposal problem due to their presence. Thus I have discovered that a very high degree of clarification of the highly dilute aqueous slurries of suspended powdered high-ash material can be effected by a froth-flotation operation in which the slurry is aerated in the presence of saponifiable acids or their soap derivatives, or both, and an oily frothing mixture containing a water-insoluble hydrocarbon oil. With some slurries it may be advisable to add further a small amount of a water-soluble salt of a heavy metal before the aeration step.

Example I

The sample used was sludge tank overflow water obtained from Kelley Creek Collieries, Morgantown, West Virginia. The contaminated water contained about 2% total suspended solids by weight. These solids assayed 22.2% ash by weight.

A portion of the contaminated water was placed in a 500 gram Farergren laboratory flotation machine. The flotation of the coal was effected through the use of Du Pont frother B-23 (a proprietary mixture of alcohols containing from 7 to 14 carbon atoms) and a refined kerosene in the amounts of 0.83 and 0.8 pound per ton of solids present in the contaminated water, respectively. No conditioning was required and the flotation of the coal was complete in about 2 minutes. The froth was highly mineralized and of such texture and consistency as to be readily amenable to dewatering. The solids floated ("coal float") comprised 83.4% by weight of the solids originally present in suspension in the contaminated water. The froth overflow contained 7.3% suspended solids by weight, which analyzed 10.0% ash.

After the coal float had been completed in the manner described, the following reagents were added to the slurry remaining in the cell in the following amounts (pounds per ton based upon the weight of the solids present in the original contaminated water sample): talloel soap, 4.15; $FeSO_4.7H_2O$, 2.3; and Tarol No. 1 (a proprietary mixture of steam distilled pine oil and rosin oil), 1.0. After the addition of these reagents, the pulp was conditioned by agitating with the air off for 30 seconds. The air was then turned on and a froth overflow carrying suspended solids was removed for 1¾ minutes. Additional talloel soap was then added in the amount of 4.15 pounds per ton of solids present in the original contaminated water, along with fresh make-up water and Du Pont frother B-23 in the amount of 0.83 pound per ton of solids present in the original contaminated water. Further froth overflow containing suspended solids was then collected for one minute. These two froth overflows were then combined to constitute an "ash float" in contradistinction to the earlier "coal float." The solids in this "ash float" were highly flocculated, in a thin froth, and readily amenable to dewatering.

The ash float contained 16.2% by weight of the suspended solids present in the original contaminated-water sample. The suspended solid content of the ash float was 2% by weight. This solid assayed 92.3% ash by weight. The residual water after the coal and ash floats contained 0.4% by weight of the suspended solids present originally in the untreated contaminated water. This clarified water contained only 0.014% of suspended solids. Thus 99.6% of the original suspended solid was removed in the combined coal and ash floats, and the final effluent water contained less than 1/100 as much suspended solid as the original colliery waste water.

My invention is generally applicable to the clarification of water which has dispersed therein powdered high-ash residues or high-ash solids derived from coal. In treating a colliery waste water which contains both powdered coal and powdered high-ash residues or high-ash solids, the coal is preferably first removed from the water by any conventional means, although this is not absolutely necessary, since I have determined that the coal and the high-ash solids can be floated at the same time to produce a froth overflow containing both the powdered coal and the powdered high-ash solids, considerably larger amounts of reagents being required, however, when the powdered coal and powdered high-ash solids are floated together.

Thus, as is known in the art and as Example I illustrates, the coal can be separated first by subjecting the water to a froth flotation operation while the water has admixed therein a frother and a light petroleum fraction. Among the frothers which are useful in this step are saturated aliphatic alcohols having from 7 to 14 carbon atoms, such as C-8, C-10 or C-12 alcohols, and cresol, pine oil, terpineol and so forth. Among the suitable petroleum distillates are kerosene and light diesel fuels.

In practicing my preferred procedure, wherein the coal is floated first, followed by flotation of the high-ash solids, the mixture during the froth flotation of the high-ash solids should contain a saponifiable acid or a soap, or both, and a frothing mixture containing a hydrocarbon oil. Thus, in place of the talloel soap used in the specific example, there can be substituted other soaps, such as sodium resinate, sodium oleate, sodium naphthenate or the corresponding potassium or ammonium compounds, or the free acids from which such soaps are derived. Among the frothers which can be employed in accordance with my invention are those mentioned in the preceding paragraph, while among the hydrocarbon oils which can be used are pine oil, rosin oil, or wood or coal tar or creosote, or mixtures thereof.

Moreover, when a water-soluble salt of a heavy metal is used in order to obtain more effective results, it is not necessary that such salt be ferrous sulfate specifically, among the water soluble heavy metal salts which can be substituted therefor being manganese sulfate, copper sulfate, lead nitrate, and manganese chloride. As I have indicated already, however, it is not absolutely necessary that the water-soluble salt of a heavy metal be used in all cases, since I have determined that with some slurries, particularly if a somewhat less perfect degree of clarification is acceptable, the water-soluble salt of a heavy metal may be omitted, or its quantity materially reduced below that given in the above example.

The relative amounts of the various reagents used are not critical, the particular amounts used in the actual practice depending upon the characteristics of the contaminated water being treated, upon the extent of clarification desired, upon the particular reagents chosen and upon other factors.

After the froth containing the powdered high-ash residues or high-ash solids has been obtained, this froth can be disposed of in any conventional manner, such as by mechanical dewatering and impounding the thickened or filtered solids, or by running the froth directly to a storage basin wherein the solids settle and essentially clear water overflows to disposal. The water remaining in the cell will be essentially clear from high-ash residues or high-ash solids, and represents the major part of the water present in the original contaminated sample.

The following additional examples illustrate the efficacy of saponifiable acids and their soaps in treating a coal slurry from the United States Steel Corporation Robena plant at Greensburg, Pennsylvania. The slurry contained 2% suspended solids by weight, which solids assayed 20.7% ash by weight.

The procedure followed in Examples II–V was identical to that employed in Example I, except as noted.

The coal float reagents were conditioned for one minute, the reagents being the same as employed in Example I, i. e., Du Pont frother B–23 and a refined kerosene in the amounts of 0.83 and 0.8 pound per ton of solids present in the coal slurry, respectively. Flotation time for the coal float ranged from 2.5 to 4 minutes.

As in Example I, the ash float was performed in two stages, the first stage and second stage overflows being combined to form the ash float. The ash float reagents were conditioned for one minute, the reagents being as noted in the respective examples. The flotation time for the ash float ranged from 5 to 6.5 minutes.

*Example II*

|  | Percent Solids | Percent Ash Content of Solids | Percent Distribution | |
|---|---|---|---|---|
|  |  |  | Solids | Water |
| Coal Slurry | 2.0 | 20.7 | 100.00 | 100.00 |
| Coal Float | 8.3 | 6.4 | 82.95 | 18.6 |
| Ash Float | 0.8 | 87.7 | 16.84 | 41.6 |
| Clarified Water | 0.011 |  | 0.21 | 39.8 |

Reagents:              Lb./ton of feed solids
  Ash float—
    Talloel soap _____ 13.50
    $FeSO_4.7H_2O$ _____ 3.50
    Tarol #1 _____ 0.50
    B–23 _____ .83

*Example III*

|  | Percent Solids | Percent Ash Content of Solids | Percent Distribution | |
|---|---|---|---|---|
|  |  |  | Solids | Water |
| Coal Slurry | 2.0 | 20.7 | 100.00 | 100.00 |
| Coal Float | 8.7 | 6.0 | 81.3 | 17.4 |
| Ash Float | 1.1 | 83.2 | 18.2 | 32.8 |
| Clarified Water | 0.019 |  | 0.5 | 49.8 |

Reagents:              Lb./ton of feed solids
  Ash float—
    Sodium oleate _____ 27.0
    $FeSO_4.7H_2O$ _____ 7.5
    Tarol #1 _____ 1.0
    B–23 _____ .83

*Example IV*

|  | Percent Solids | Percent Ash Content of Solids | Percent Distribution | |
|---|---|---|---|---|
|  |  |  | Solids | Water |
| Coal Slurry | 2.0 | 20.7 | 100.00 | 100.00 |
| Coal Float | 7.7 | 6.7 | 81.8 | 20.8 |
| Ash Float | 0.71 | 81.7 | 18.0 | 53.4 |
| Clarified Water | 0.015 |  | 0.2 | 25.8 |

Reagents:              Lb./ton of feed solids
  Ash float—
    Oleic acid _____ 20.0
    $FeSO_4.7H_2O$ _____ 25.0
    Tarol #1 _____ 1.0
    B–23 _____ 1.66

*Example V*

|  | Percent Solids | Percent Ash Content of Solids | Percent Distribution | |
|---|---|---|---|---|
|  |  |  | Solids | Water |
| Coal Slurry | 2.0 | 20.7 | 100.00 | 100.00 |
| Coal Float | 20.5 | 6.6 | 82.0 | 6.7 |
| Ash Float | 0.5 | 81.5 | 16.9 | 70.4 |
| Clarified Water | 0.11 | 81.5 (est.) | 1.1 | 22.9 |

Reagents:              Lb./ton of feed solids
  Ash float—
    Tall oil _____ 23.00
    $FeSO_4.7H_2O$ _____ 20.00
    Tarol #1 _____ 1.00
    B–23 _____ 2.49

This application is a continuation-in-part of my co-pending application Serial No. 225,279, filed May 8, 1951.

I claim:

1. A process for the clarification of an aqueous slurry containing suspended powdered high-ash solids derived from coal which comprises admixing a material selected from the group consisting of saponifiable acids and their soaps and a frothing mixture containing a water-insoluble hydrocarbon oil with said slurry, passing air through the admixture to produce a froth overflow containing said suspended powdered high-ash solids, and removing the froth overflow whereby the remaining water is substantially clarified of said suspended powdered high-ash solids.

2. A process as in claim 1 in which the frothing mixture contains a saturated aliphatic alcohol having from 7 to 14 carbon atoms.

3. A process as in claim 1 in which the mixture subjected to the froth flotation contains a water-soluble salt of a heavy metal.

4. A process as in claim 3 in which said salt is ferrous sulfate.

5. A process for the clarification of an aqueous slurry containing suspended powdered high-ash solids derived from coal which comprises admixing a soap and a frothing mixture containing a water-insoluble hydrocarbon oil with said slurry, passing air through the admixture to produce a froth overflow containing said suspended powdered high-ash solids, and removing the froth overflow whereby the remaining water is substantially clarified of said suspended powdered high-ash solids.

6. A process as in claim 5 in which the soap is talloel soap.

7. A process for the clarification of an aqueous slurry containing suspended powdered high-ash solids derived from coal which comprises admixing a saponifiable acid and a frothing mixture containing a water-insoluble hydrocarbon oil with said slurry, passing air through the admixture to produce a froth overflow containing said suspended powdered high-ash solids, and removing the froth overflow whereby the remaining water is substantially clarified of said suspended powdered high-ash solids.

8. A process according to claim 7 in which the acid is talloil.

9. A process for the clarification of an aqueous slurry containing suspended powdered coal and suspended powdered high-ash solids derived from coal which comprises producing a froth float containing the suspended powdered coal, withdrawing said froth float whereby the remaining aqueous mixture contains the suspended powdered high-ash solids, and thereafter admixing a material selected from the group consisting of saponifiable acids and their soaps and a frothing mixture containing a water-insoluble hydrocarbon oil with said slurry, passing air through the admixture to produce a froth overflow containing said suspended powdered high-ash solids, and removing the froth overflow whereby the remaining water is substantially clarified of said suspended powdered high-ash solids.

References Cited in the file of this patent

UNITED STATES PATENTS

| | | |
|---|---|---|
| 1,333,393 | Edser et al. | Mar. 9, 1920 |
| 2,153,449 | Booth | Apr. 4, 1939 |
| 2,330,589 | Juell | Sept. 28, 1953 |

OTHER REFERENCES

Industrial and Engineering Chemistry, vol. 39, May 1947, pages 646–652. (Copy in Scientific Library.)

Milling Methods, 1939, article by Taggart et al., pages 189–190. (Copy in Division 55.)